(12) United States Patent
Lee

(10) Patent No.: US 6,984,677 B2
(45) Date of Patent: Jan. 10, 2006

(54) FLAME RETARDANT INSULATION COMPOSITION HAVING IMPROVED SCORCH RESISTANCE

(75) Inventor: Lester Y. Lee, Hamilton, OH (US)

(73) Assignee: Equistar Chemicals, LP, Houston, TX (US)

( * ) Notice: Subject to any disclaimer, the term of this patent is extended or adjusted under 35 U.S.C. 154(b) by 332 days.

(21) Appl. No.: 10/268,636

(22) Filed: Oct. 10, 2002

(65) Prior Publication Data

US 2004/0072930 A1    Apr. 15, 2004

(51) Int. Cl.
*C08K 5/34* (2006.01)
*C08K 5/24* (2006.01)
*C08K 5/09* (2006.01)
*C08K 5/13* (2006.01)

(52) U.S. Cl. .................. 524/93; 524/100; 524/101; 524/264; 524/291; 524/343; 524/430; 524/437

(58) Field of Classification Search .................. 524/93, 524/100, 101, 264, 291, 343, 430, 437
See application file for complete search history.

(56) References Cited

U.S. PATENT DOCUMENTS

| 3,832,326 | A | 8/1974 | North et al. |
| 3,922,422 | A | 11/1975 | Wise |
| 3,954,907 | A | 5/1976 | Schober |
| 4,349,605 | A | 9/1982 | Biggs et al. |
| 4,381,362 | A | 4/1983 | Biggs et al. |
| 5,225,468 | A | 7/1993 | Biggs |
| 5,298,564 | A | 3/1994 | Suyama et al. |
| 6,326,422 | B1 | 12/2001 | Horwatt |
| 6,372,828 | B2 | 4/2002 | Lee |
| 6,392,154 | B1 | 5/2002 | Lee et al. |

*Primary Examiner*—Kriellion A. Sanders
(74) *Attorney, Agent, or Firm*—Gerald A. Baracka; William A. Heidrich

(57) ABSTRACT

Crosslinkable, flame retardant insulation compositions having improved resistance to scorch are provided. The compositions are comprised of a base resin, hydrated inorganic filler, coupling agent and stabilizer and formulated with a peroxide/scorch retardant combination, specifically, a combination of α,α'-bis(t-butylperoxy)diisopropyl benzene and 2,4-diphenyl-4-methyl-1-pentene.

12 Claims, No Drawings

FLAME RETARDANT INSULATION COMPOSITION HAVING IMPROVED SCORCH RESISTANCE

BACKGROUND OF THE INVENTION

1. Field of the Invention

This invention relates to compositions useful for insulating wire and cable. More specifically, the compositions are crosslinkable, flame retardant compositions of copolymers of ethylene with vinyl carboxylates, alkyl acrylates or alkyl methacrylates, hydrated inorganic fillers, coupling agents, stabilizers and a peroxide/scorch retarding additive combination consisting essentially of $\alpha,\alpha'$-bis(t-butylperoxy)diisopropyl benzene and 2,4-diphenyl-4-methyl-1-pentene. The flame retardant compositions make it possible to achieve faster cures while retaining acceptable scorch.

2. Description of the Prior Art

Crosslinkable polymers, such as ethylene-vinyl carboxylate and alkyl(meth)acrylate copolymers, formulated with hydrated inorganic fillers, one or more stabilizers and one or more crosslinking agents are widely used fire retarding insulations for wire and cable. Other additives such as pigments, processing oils, lubricants and coupling agents can also be included in these formulations. Compositions of this type which find use as single layer insulation and jacketing for copper wire are disclosed in U.S. Pat. Nos. 3,832,326 and 3,922,422 to North, et al., and U.S. Pat. Nos. 4,349,605 and 4,381,362 to Biggs, et al.

A wide variety of organic peroxides are known to be effective crosslinking agents; however, in recent years with emphasis on increasing coating line speeds the focus has been on the use of high activity peroxides which provide acceptable cure rates at high line speeds. There are, however, some problems associated with their use. One particularly troublesome feature is the tendency of high activity peroxides to scorch. Scorching is the undesirable premature crosslinking of the formulation during compounding and extrusion, i.e., mixing and coating of the wire prior to curing of the coated wire in the vulcanization step.

Premature crosslinking during processing results in the formation of undesirable gel particles in the melt. The presence of gel particles can result in rough surface appearance of the extruded insulation. In addition to detracting from the aesthetics of the coated wire, these regions of irregularity are often more susceptible to electrical failure or mechanical breakdown. Any premature crosslinking during processing also increases the amount of work necessary to process the formulation. This, of course, results in higher energy costs for the processor.

Possibly the biggest problem with the use of high activity peroxides is that they limit the flexibility of the processor during coating line interruptions. Insulation compositions formulated with these peroxides have a relatively short processing window. In a worst case scenario, if production is interrupted for a period beyond the useful life of a batch being processed, the entire batch must be removed from the mixer and scrapped.

One approach to expanding the processing window and extending scorch times has been the use of so-called scorch retardants. Monomeric vinyl compounds, such as $\alpha$-methyl styrene and lauryl or stearyl methacrylate, are disclosed in U.S. Pat. No. 3,954,907 to be useful scorch retardants for ethylene polymer compositions. 2,4-Diphenyl-4-methyl-2-pentene, a dimer produced by the dimerization of $\alpha$-methylstyrene, is also disclosed in U.S. Pat. No. 5,298,564. Neither reference, however, deals with flame retardant compositions and, more particularly, compositions which are rendered flame retardant as a result of the incorporation of high levels of hydrated inorganic fillers therein.

The ability to extend scorch time is particularly advantageous with insulation compositions which are flame retardant as a result of the inclusion of high levels of hydrated inorganic fillers since rigorous processing is required to incorporate and uniformly disperse the filler within the polymer matrix.

It would be highly desirable to have flame retardant insulation compositions having rapid cure rates and significantly improved scorch times. These objectives are achieved with the compositions of the present invention which will be described in more detail to follow.

SUMMARY OF THE INVENTION

It is an object of the present invention to provide improved crosslinkable, flame retardant polymeric compositions useful for insulating wire and cable which have good processing characteristics and improved scorch resistance. The above objectives are realized utilizing ethylene copolymer base resins formulated with hydrated inorganic fillers, alkoxysilane coupling agents, stabilizers and a crosslinking package consisting of the combination of $\alpha,\alpha'$-bis(t-butylperoxy)diisopropyl benzene and 2,4-diphenyl-4-methyl-1-pentene. Optionally, a multifunctional crosslinking coagent may be included in the crosslinking package. By utilizing this specific crosslinking combination it is possible to significantly increase the cure efficiency of the insulation compositions.

More specifically, the compositions comprise (1) 20 to 60 wt. % of a base resin selected from the group consisting of ethylene-vinyl carboxylate copolymer, ethylene-alkyl acrylate copolymer and ethylene-alkyl methacrylate copolymer, and having a melt index of 0.1 to 10 g/10 min.; (2) 35 to 75 wt. % hydrated inorganic filler; (3) 0.1 to 2.5 weight percent alkoxysilane coupling agent having 2 or 3 $C_{1-3}$ alkoxy substituents; (4) 0.2 to 4.0 wt. % stabilizer; and (5) 0.4 to 8.0 wt. % of a crosslinking component comprised of $\alpha,\alpha'$-bis (t-butylperoxy)diisopropyl benzene and 2,4-diphenyl-4-methyl-1-pentene present at a weight ratio of 10:1 to 1:1.

Highly useful compositions are obtained when the base resin is a copolymer of ethylene and a vinyl ester of a $C_{2-6}$ aliphatic carboxylic acid. Copolymers of ethylene and vinyl acetate are especially useful particularly when formulated with aluminum trihydrate, vinyltrimethoxysilane or vinyltriethoxysilane, a hindered phenol stabilizer and the crosslinking component.

DESCRIPTION OF THE INVENTION

The present invention relates to wire and cable insulation compositions which are crosslinkable and flame retardant by virtue of having high loadings of hydrated inorganic fillers and which have rapid cure rates with significantly extended scorch times. The compositions of the invention are comprised of an ethylene-vinyl carboxylate, ethylene-alkyl acrylate or ethylene alkyl methacrylate base polymer, a hydrated inorganic filler, a coupling agent, a hindered phenol stabilizer or stabilizer package and a chemical crosslinking combination consisting essentially of α,α'-bis(t-butylperoxy)diisopropyl benzene (α,α'-BTDB), 2,4-diphenyl-4-methyl-1-pentene (DMP) and, optionally, a multifunctional crosslinking coagent.

Polymers used to obtain the improved insulation compositions of the invention, referred to herein as the base resin, are copolymers of ethylene and functionalized comonomers which may be vinyl esters or alkyl acrylates, the latter being used in the generic sense to encompass alkyl esters of both acrylic and methacrylic acid. The vinyl carboxylates may be vinyl esters of a $C_2$–$C_6$ aliphatic carboxylic acids, such as vinyl acetate, vinyl propionate, vinyl butyrate, vinyl pentanoate or vinyl hexanoate. The acrylates may be any of the $C_1$–$C_6$ alkyl esters of acrylic or methacrylic acid including, for example, methyl, ethyl, propyl, butyl, pentyl or hexyl acrylate or methacrylate.

Preferred copolymers for the compositions of the invention are ethylene-vinyl acetate (EVA) copolymers containing about 5% to about 45% and, more preferably, 9% to about 30%, vinyl acetate, with the balance being ethylene. Terpolymers of ethylene, vinyl acetate and other known olefinic monomers polymerizable therewith can also be employed. If a third monomer is present, it will constitute no more than about 15% of the polymer composition.

Copolymers of ethylene and butyl acrylate are another highly useful base resin which can be used to formulate the improved compositions of the invention. Useful ethylene-butyl acrylate (EBA) copolymers contain about 10% to about 45% and, more preferably, 20% to 40% butyl acrylate—the balance being ethylene. n-Butyl acrylate is a preferred comonomer.

Blends of EVA and EBA, particularly where EVA comprises the major component of the blend, can also be used. The EVA will generally constitute greater than 75% of such blends.

The base resin, whether comprised of a single copolymer or mixture of copolymers, generally will have a melt index (MI) in the range 0.1 to 10 g/10 min and, more preferably, from 0.3 to 5 g/10 min. Melt index figures are equivalent values correlated from melt flow rates determined in accordance with ASTM D 1238.

Minor amounts of other crosslinkable polymers or copolymers may be included in the compositions of this invention; however, the above-described ethylene copolymers should comprise at least 50% of the total base resin component. Representative polymeric components which can be used include polyethylene, polypropylene, ethylene-propylene copolymers and terpolymers, and the like. Low density polyethylene (LDPE) and linear low density polyethylene (LLDPE) having melt indexes from 0.5 to 5 provide particularly desirable blends when used in amounts of 30% or less, based on the total polymers comprising the base resin.

One or more hydrated inorganic fillers is included in the formulations of the invention. These fillers function as flame retardants by endothermically releasing water of hydration bound to the filler upon combustion or ignition of the base resin. Hydrated inorganic fillers useful for the invention include hydrated aluminum oxides ($Al_2O_3.3H_2O$ or $Al(OH)_3$, hydrated magnesia, hydrated calcium silicate, hydrated magnesium carbonate and the like. Aluminum trihydrate (ATH) is preferred. Minor amounts of other known filler materials may also be present. The filler size will be in accordance with those sizes used in the prior art.

Still other flame retardant materials are optionally included. These can include antimony trioxide ($Sb_2O_3$) and halogenated organic compounds, preferably brominated compounds having bromine atoms attached to monocyclic, bicyclic or multicyclic rings. Representative halogenated compounds of this type include decabromodiphenyl ether, hexabromobenzene, pentabromoethylbenzene, octabromodiphenyl, pentabromodiphenyl ether, tetrabromobisphenol A, hexabromocyclododecane, and the like.

A coupling agent to facilitate incorporation of the hydrated inorganic filler in the base resin is also included. In one highly useful embodiment the coupling agent is an alkoxysilane compound. Conventional alkoxysilane known to the art can be used so long as they do not combust or degrade during polymer processing or interfere with crosslinking. Alkoxysilanes having 2 or 3 $C_{1-3}$ alkoxy substituents, e.g., methoxy, ethoxy, propoxy or combinations thereof, are particularly advantageous. Illustrative silanes include methyl triethoxysilane, methyltris (2-methoxyethoxy) silane, dimethyldiethoxysilane, ethyltrimethoxysilane, vinyltris (2-methoxyethoxy)silane, phenyltris(2-methoxyethoxy)silane, vinyltrimethoxysilane (VTMOS) and vinyltriethoxysilane (VTEOS) and gamma methacryloxypropyltrimethoxysilane. It is preferred to use vinylalkoxysilanes and VTMOS and VTEOS are especially preferred.

The compositions also contain one or more stabilizers, at least one of which is a hindered phenol stabilizer, to impart the requisite thermal and oxidative stability. Useful optional stabilizers include thioesters, zinc salts of mercaptobenzimidazoles, aromatic secondary amines, bis alkyl sulfides, polymerized 1,2-dihydro-2,2,4-trimethyl quinoline, tris(3,5-di-t-butyl-4-hydroxybenzyl)isocyanurate, and the like.

The hindered phenol stabilizers will contain one or more substituted phenyl groups of the formula:

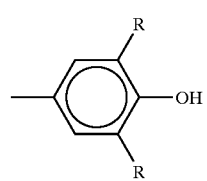

where R is a $C_{1-4}$ alkyl group and, most preferably, a tertiary butyl group. Where more than one 3,5-dialkyl-4-hydroxyphenyl group is present, they will be joined through a linking group and the resulting compounds will correspond to the formula

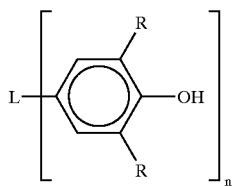

where n is an integer from 2 to 4 and L represents the linking group.

Representative linking groups can include:

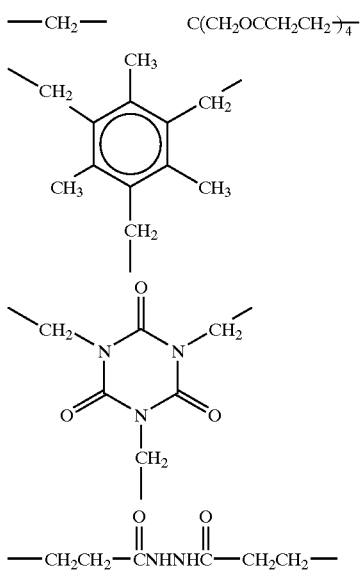

It is especially advantageous when the above-identified linking moieties are substituted with 3,5-di-t-butyl-4-hydroxyphenyl groups.

Highly useful hindered phenol compounds of the above types include:

4,4'-methylenebis(2,6-di-t-butylphenol);

tetrakis[methylene (3,5-di-t-butyl-4-hydroxyhydrocinnamate)methane;

1,3,5-trimethyl-2,4,6-tris(3,5-di-t-butyl-4-hydroxybenzyl)-benzene;

1,3,5-tris(3,5-di-t-butyl-4-hydroxybenzyl)-s-triazine 2,4,6(1H,3H,5H)trione;

N,N'-bis[3-(3,5-di-t-butyl-4-hydroxyphenyl)propanyl]-hydrazine;

octadecyl 3,5-di-t-butyl-4-hydroxyhydrocinnamate; and thiodiethylene bis(3,5-di-tert-butyl-4-hydroxyhydrocinnamate).

To obtain the insulation compositions of the invention having high cure rates and reduced scorching tendency a specific combination of organic peroxide and scorch retardant are employed. This combination is referred to herein as the crosslinking component or crosslinking package. The organic peroxide is α,α'-BTDB. α,α'-BTDB is a commercially available product consisting of a mixture of para and meta isomers. α,α'-BTDB is a known crosslinking agent for insulation. Employed with the α,α'-BTDB is a specific scorch retardant additive, namely DMP. Whereas other scorch retardants are effective with α,α'-BTDB to reduce scorch, they also have a significant adverse affect on the cure efficiency. The ability to obtain rapid cures while reducing the scorch of the compositions is expressed in a single parameter, derived from oscillating disc rheometer data and referred to as "cure efficiency". Cure efficiency and its derivation is described in the examples.

The α,α'-BTDB and DMP are employed at weight ratios of 10:1 to 1:1 and, most preferably, from 5:1 to 2:1.

In a particularly useful embodiment, a multifunctional crosslinking coagent is utilized with the α,α'-BTDB and DMP. Such coagents include triallyl cyanurate, triallyl isocyanurate, diallyl phthalate, trimethylolpropane trimethacrylate, N,N'-m-phenylene dimaleimide and the like. Of these, triallyl cyanurate (TAC) has been found to be particularly advantageous in combination with α,α'-BTDB and DMP. The weight ratio of α,α'-BTDB to crosslinking coagent will be from 10:1 to 1:1 and, most preferably, from 3:1 to 1:1.

The improved flame retardant, crosslinkable insulation compositions of the invention will contain 20 to 60 weight percent (wt. %) base resin, 35 to 75 wt. % hydrated inorganic filler; 0.1 to 2.5 wt. % coupling agent; 0.2 to 4.0 wt. % stabilizer; and 0.4 to 8.0 wt. % of the crosslinking package comprising the α,α'-BTDB and DMP. Weight percentages are based on the total weight of the composition. Especially useful compositions contain 40 to 50 wt. % base resin; 50 to 60 wt. % of the filler; 0.4 to 1.0 wt. % coupling agent; 0.75 to 1.5 wt. % stabilizer; and 1.0 to 4.0 wt. % crosslinking package.

Other conventional additives such as carbon black, pigments, processing aids and the like can be included in the formulations provided these additives do not interfere with crosslinking, substantially reduce the scorch time or otherwise detract from the physical properties of the insulation. Processing aids which can advantageously be employed include fatty acids or fatty acid derivatives, polymeric processing resins and hydrocarbon oils, or combinations thereof. The fatty acid derivatives can include metal soaps, esters, ester-soaps, amides and the like. The total amount of any additional ingredients will generally not exceed 10 wt. % and, most typically, will constitute less than 5 wt. of the total composition.

The ingredients can be combined with the base resin separately or added as a mixture or masterbatch. It is particularly advantageous that the coupling agent be added to the base resin and blended before addition of the hydrated filler and other additives. The base resin and other ingredients are blended in a mixer or the like. Mixers capable of imparting high shear such as Banbury mixers, Farrel continuous mixers, Boiling Mixtrumat™ mixers or Werner & Pfleiderer mixers are most commonly used.

The following examples illustrate the invention; however, those skilled in the art will recognize numerous variations that are within the spirit of the invention and scope of the claims.

Cure rates, scorch times and maximum cure were determined using a Monsanto oscillating disc rheometer (ODR). Samples were prepared by melting 8–10 grams of the composition to be evaluated to form a small disc about 1 inch in diameter. The sample chamber is preheated to the cure temp. before sample insertion. Cure rates and maximum torque were determined at 370° F. The time to reach 70% of the maximum torque ($t_{70}$) is reported in minutes and indicates the rate of cure. The maximum torque ($T_{max}$) developed indicates the maximum cure of the composition and is reported in pounds/inch. Scorch data are obtained operating at 330° F. The time (in minutes) to reach a torque of 10 lbs/in ($t_{10}$) at 330° F. is reported as the scorch time.

Cure efficiency is calculated using the three measurements, $t_{70}$, $T_{max}$ and $t_{10}$ in accordance with the formula Cure Efficiency=$E_s$×0.25 $T_{max}$ where $E_s$ is the total scorch retardation efficiency. The factor of 0.25 $T_{max}$ is to account for the apparent viscosity increase due to the hydrated filler. Total scorch retardation efficiency ($E_s$) is defined as 0.75 $t_{10}$+0.25 ($t_{10}$–$t_{70}$) where the first term (weighted 75%) accounts for the main scorch resistance and the second term accounts for the cure retardation. The logic is that if $t_{70}$ is large it will contribute negatively to $E_s$. If the converse is true, then $E_s$ will be larger

EXAMPLE 1

A flame retardant crosslinkable composition of the invention having the following weight percentages of ingredients and suitable for wire insulation was prepared by melt blending
  44.3% ethylene-vinyl acetate copolymer (18% VA; MFR 2.2 g/10 min)
  53.2% ATH
  0.65% hindered phenol stabilizer (IRGANOX 1010)
  0.33% thioester stabilizer (SEENOX 4125)
  0.11% lauric acid
  0.33% ethylene-bis-stearamide
  0.53% VTMOS
  0.56% α,α'-BTDB
  0.2% DMP The above composition, when evaluated for cure using the ODR, had a cure rate ($t_{70}$) of 4.64 minutes and scorch time ($t_{10}$) of 4.28 minutes. $T_{max}$ was 80 lbs/in. The cure efficiency was calculated to be 62.

COMPARATIVE EXAMPLE A

To demonstrate the significant improvement obtained with the insulation compositions of the invention, Example 1 was repeated except that the DMP was omitted. Whereas slightly faster cure ($t_{70}$=4.02) and slightly higher cure($T_{max}$=84) were obtained, the scorch time was significantly less than that achieved with the inventive composition of Example 1. The time to scorch ($t_{10}$) for the comparative formulation was only 2.76 minutes—a 35% reduction from that obtained using the α,α'-BTDB/DMP combination. The cure efficiency was only 37.

Increasing the amount of α,α'-BTDB to 0.76 wt. % in comparative formulation A, increased the cure rate ($t_{70}$) to 2.57 minutes; however, the scorch time ($t_{10}$) was correspondingly shortened by nearly 50%. $t_{10}$ in this case was only 2.18 minutes and the cure efficiency was still only 43. Furthermore, the use of higher levels of peroxide have an antagonistic effect on hindered phenol stabilizers and reduce their efficiency.

COMPARATIVE EXAMPLE B

While it is possible to obtain increased cure rate of flame retardant compositions using other organic peroxides, such as dicumyl peroxide, they typically have much shorter scorch times than desired. For example, when dicumyl peroxide is substituted for the α,α'-BTDB of comparative formulation A, the cure efficiency is reduced even further. While the cure rate ($t_{70}$) is increased to 2.10 minutes, the scorch time ($t_{10}$) is reduced to only 1.34 minutes. This results in a cure efficiency of only 17. In addition to producing "scorchy" formulations, the dicumyl peroxide releases objectionable odors during processing.

COMPARATIVE EXAMPLE C

Example 1 was also repeated replacing the DMP with 0.2 wt. % lauryl methacrylate (LM), a known scorch retardant additive. Scorch time ($t_{10}$) for the product of Comparative Example C was 3.02 compared to 4.28 minutes for the inventive composition of Example 1 formulated with DMP. In other words, a 45% improvement in scorch time is obtained with the flame retardant composition of the invention compared to identically prepared formulations using LM as the scorch retardant with α,α'-BTDB. The cure efficiency of the formulation prepared using LM with the α,α'-BTDB was only 41.

Whereas it may be suggested that increasing cure efficiency by using DMP with the α,α'-BTDB would be expected, this is not the case since as is demonstrated in Comparative Example C the combination of other known scorch retardants with α,α'-BTDB provide little or no improvement in cure efficiency.

EXAMPLE 2

Example 1 was repeated except that a multifunctional crosslinking coagent was included in the composition. 0.2 Wt. % triallyl cyanurate (TAC) was incorporated in the formulation of Example 1. The composition had a cure rate ($t_{70}$) of 3.36 minutes and scorch time ($t_{10}$) of 3.50 minutes. The cure efficiency was 67.

EXAMPLE 3

Example 2 was repeated except that the amount of TAC was increased to 0.5 wt. %. The cure rate ($t_{70}$) was increased to 2.53 minutes; however, the scorch time was still a very manageable 3.29 minutes. The cure efficiency was increased to 84.

EXAMPLE 4

To demonstrate the significance of the improvement obtained with the flame retardant compositions of the invention, the inventive composition of Example 1 containing both α,α'-BTDB and DMP was evaluated on a commercial wire coating line to determine maximum line speed. Two types of wire were produced—TXL and GXL. The TXL (thin wall crosslinked insulated wire) had a 16 mil wall thickness and the GXL (general purpose crosslinked insulated wire) had a wall thickness of 23 mil. The wire line consisted of a single extruder (L/D 20:1; screw speed 14 rpm; heating zones 225–235° F.; die temperature 240° F.) and a vulcanization tube maintained at 240 psi. Both types of wire were coated at different line speeds with all other process parameters unchanged to determine the maximum speed at which a smooth, uniform insulation layer could be applied to the wire without processing or other operational problems. Using the composition of Example 1 it was possible to operate at a maximum line speed of 1800 feet per minute (fpm) for both TXL and GXL wire production. When a comparable composition containing α,α'-BTDB but no DMP was evaluated under the same production conditions, the maximum line speeds for TXL and GXL wires were 1000 fpm and 1100 fpm, respectively.

I claim:

1. A crosslinkable, flame retardant insulation composition having improved scorch resistance comprising:
   1) 20 to 60 wt. % of a base resin selected from the group consisting of ethylene-vinyl carboxylate copolymer, ethylene-alkyl acrylate copolymer and ethylene-alkyl methacrylate copolymer, and having a melt index of 0.1 to 10 g/10 min.;
   2) 35 to 75 wt. % hydrated inorganic filler;
   3) 0.1 to 2.5 weight percent alkoxysilane coupling agent having 2 or 3 $C_{1-3}$ alkoxy substituents;
   4) 0.2 to 4.0 wt. % stabilizer comprising at least one hindered phenol stabilizer selected from the group consisting of 4,4'-methylenebis(2,6-di-t-butylphenol); tetrakis[methylene(3,5-di-t-butyl-4-hydroxyhydrocinnamate)]methane; 3,5-trimethyl-2,4,6-tris(3,5-di-t-butyl-4-hydroxybenzyl)-benzene; 1,3,5-tris(3,5-di-t-butyl-4-hydroxybenzyl)-s-triazine 2,4,6(1H,3H,5H) trione; N,N'-bis[3-(3,5-di-t-butyl-4-hydroxyphenyl) propanyl]-hydrazine; octadecyl 3,5-di-t-butyl-4-hydroxyhydrocinnamate; and thiodiethylene bis(3,5-di-tert-butyl-4-hydroxyhydrocinnamate); and
   5) 0.4 to 8.0 wt. % of a crosslinking component comprised of α,α'-bis(t-butylperoxy)diisopropyl benzene and 2,4-diphenyl-4-methyl-1-pentene present at a weight ratio of 10:1 to 1:1.

2. The composition of claim 1 wherein the crosslinking component additionally contains a multifunctional crosslinking coagent, the weight ratio of α,α'-bis(t-butylperoxy)diisopropyl benzene to multifunctional crosslinking agent ranging from 10:1 to 1:1.

3. The composition of claim 2 wherein the multifunctional crosslinking agent is selected from the group consisting of triallyl cyanurate, triallyl isocyanurate, diallyl phthalate, trimethylolpropane trimethacrylate, and N,N'-m-phenylene dimaleimide and the weight ratio of α,α'-bis(t-butylperoxy) diisopropyl benzene to multifunctional crosslinking agent is from 3:1 to 1:1.

4. The composition of claim 1 wherein the hydrated inorganic filler is aluminum trihydrate.

5. The composition of claim 1 wherein the alkoxysilane coupling agent is vinyltrimethoxysilane or vinyltriethoxysilane.

6. The composition of claim 1 wherein one or more additional stabilizers selected from the group consisting of thioesters, zinc salts of mercaptobenzimidazoles, aromatic secondary amines, bis alkyl sulfides, polymerized 1,2-dihydro-2,2,4-trimethyl quinoline and tris(3,5-di-t-butyl-4-hydroxybenzyl) isocyanurate are present with the hindered phenol.

7. The composition of claim 1 wherein (1) is present from 40 to 50 wt. %, (2) is present from 50 to 60 wt. %, (3) is present from 0.4 to 1.0 wt. %, (4) is present from 0.75 to 1.5 wt. %, and (5) is present from 1.0 to 4.0 wt. %.

8. The composition of claim 1 wherein the base resin is a copolymer of ethylene and a vinyl ester of a $C_2$–$C_6$ aliphatic carboxylic acid.

9. The composition of claim 8 wherein the base resin has a melt index of 0.3 to 5.0 g/10 min.

10. The composition of claim 8 wherein the base resin is a copolymer of ethylene and 5 to 45 wt. % vinyl acetate.

11. The composition of claim 1 wherein the base resin is a copolymer of ethylene and 10 to 45 wt. % n-butyl acrylate.

12. The composition of claim 11 wherein the base resin has a melt index of 0.3 to 5.0 g/10 min.

* * * * *